United States Patent [19]
Stull et al.

[11] Patent Number: 5,473,233
[45] Date of Patent: Dec. 5, 1995

[54] ELECTROMAGNETICALLY PROPELLED HIGH-SPEED HIGH-CAPACITY TRANSPORTATION SYSTEM FOR SHORT-DISTANCE TRAVEL IN URBAN AND SUBURBAN AREAS

[76] Inventors: Mark A. Stull, 35 Blackbird Dr.; George F. Dippel, 33 Windsong Cir., both of Bedford, N.H. 03110

[21] Appl. No.: 208,426

[22] Filed: Mar. 8, 1994

[51] Int. Cl.$^6$ .................................................... B61B 1/00
[52] U.S. Cl. .......................... 318/587; 104/27; 104/295
[58] Field of Search .................................. 318/580, 587, 318/687, 135; 180/2.1; 364/424.01, 424.02, 424.03, 443, 444; 104/23.1, 23.2, 27, 28, 88 R, 88 C, 88 F, 88 D, 130.1, 281, 288, 290, 295

[56] References Cited

U.S. PATENT DOCUMENTS

| | | |
|---|---|---|
| 3,590,743 | 7/1971 | Larson . |
| 3,853,068 | 12/1974 | Avery . |
| 3,901,160 | 8/1975 | Auer, Jr. . |
| 4,061,089 | 12/1977 | Sawyer . |
| 4,313,383 | 2/1982 | Parazader . |
| 4,685,398 | 8/1987 | Kissel, Jr. . |
| 5,282,424 | 2/1994 | O'Neill . |
| 5,310,999 | 5/1994 | Claus et al. . |

*Primary Examiner*—Bentsu Ro

[57] ABSTRACT

An electromagnetically propelled transportation system designed to provide extremely high capacity at travel speeds between 50 and 150 miles per hour, to serve as a means of transportation within contiguous urban and suburban areas. The transportation system includes centrally controlled vehicles operated on a dedicated guideway, propelled by an embedded linear synchronous motor or other linear motor, which uses coils embedded in the guideway to carry an electric current which provides the propulsion force for vehicles on the guideway. In addition, the transportation system includes other components necessary to the operation of a high-capacity high-speed urban transportation system, such as off-line stations, entry and exit ramps, for acceleration and deceleration, which connect stations to the dedicated guideway, with appropriate branching to permit the same vehicle flow rate on the ramps as on the dedicated guideway, and means of switching or steering vehicles between the ramps and the guideway. Provision is made for passengers to obtain automated entry to the system. Vehicles have dual-use capability, so as to be able to operate on city streets as well as the dedicated guideway.

28 Claims, 8 Drawing Sheets

ELECTROMAGNETICALLY PROPELLED HIGH-SPEED HIGH-CAPACITY TRANSPORTATION SYSTEM FOR SHORT-DISTANCE TRAVEL IN URBAN AND SUBURBAN AREAS

FIELD OF THE INVENTION

The present invention is an electromagnetically propelled transportation system adapted specifically to serve short-distance travel needs within contiguous urban and suburban areas.

BACKGROUND OF THE INVENTION

It is no great secret that transportation systems in major metropolitan areas are impossibly congested, and that the rising cost of operating urban mass-transit systems is straining the finances of many cities and states to the breaking point. In virtually all large American cities excessive use of private automobiles has resulted in dangerous levels of air pollution, unacceptably high consumption of imported oil, and an intolerable rate of personal injury and property losses due to accidents. The capacity of a typical highway lane is only 1,500 to 2,000 passenger cars per hour; as a result it is impossible to obtain enough land in urban areas to permit construction of freeways with sufficient numbers of lanes to alleviate congestion. Furthermore, even if such freeways were built, the existing network of city streets could not absorb the traffic flow that would result, and air pollution levels would be driven even higher. As a result, no transportation system based on the gasoline-powered private automobile is capable of solving urban transportation problems.

Electrically powered automobiles have not, to date, presented a viable solution to the foregoing problems. Electrically powered vehicles are handicapped by limited range, high cost, and inconvenience of use due to long recharging times. Even if these problems were overcome, congestion would not be relieved by the mere substitution of electric vehicles for gasoline-powered vehicles on our present highway system, nor would the rate of automobile accidents be reduced.

Steel-wheel-on-rail mass-transit systems suffer from a variety of handicaps, most of which result from the inherent limitations of this nineteenth century technology. The capacity of a single track is no greater than that of a single highway lane; higher capacities are achieved in present urban transit systems only by subjecting passengers to barbaric levels of overcrowding and discomfort. The typical urban rail system is slow; for distances of only several miles, travel times (including waiting time for trains) often exceed half an hour. Maintenance and operating costs for urban rail systems are high and rising; their reliance on mechanical, rail-moving switching systems is a proven safety hazard. Worst of all, passengers using urban rail systems "can't get there from here" as many destinations of choice are not within walking distance of stations. This inconvenience of use is one of the major factors which influences the potential ridership of urban mass-transit to rely on private automobiles instead.

Mass-transit systems based on buses suffer similar problems. Buses which use congested city streets are extremely slow. Buses which achieve higher speed, for example by operating on dedicated freeway lanes for high occupancy vehicles, lack the private automobile's capability to provide convenient on-demand departure to destination transport for individual riders.

Aircraft have not proved viable for short-distance mass-transit in urban and suburban areas.

Magnetically levitated (maglev) transportation systems appear greatly superior to other forms of transportation for inter-city travel over distances between approximately 50 and 500 miles. However, maglev systems cannot meet the needs of shorter distance travel within metropolitan areas. Although maglev can operate along most interstate highway rights of way at speeds of 300 miles per hour or greater, curvature and grades on likely urban rights of way, as well as noise considerations, limit peak urban-area speeds to the vicinity of 150 miles per hour. At such low speeds magnetic levitation is inefficient and uneconomical due to the effects of electromagnetic drag. Furthermore, maglev systems permit stations to be located no closer than 10 to 20 miles apart. Although this separation distance permits maglev systems to serve adjacent cities and metropolitan areas along a several hundred mile corridor, and represents one of maglev's great advantages over high-speed steel-wheel on rail technologies (which require much greater station separations), it is inadequate for service within urban areas.

SUMMARY OF THE INVENTION

The present invention overcomes the inadequacies of the foregoing transportation systems by a novel and innovative combination of technologies. It is designed to provide much higher speed and capacity than can be obtained from presently available systems. It is also designed to achieve a very high degree of safety, to operate in an energy-efficient and environmentally benign manner, and to limit costs sufficiently to permit fares equal to or lower than those typically charged by present urban mass-transit systems. Finally, the system is designed to provide a high degree of passenger comfort and convenience. The principal objectives of the present invention include the following:

1. To provide a means for mass transportation within contiguous urban and suburban areas over distances of up to several dozen miles, more or less, along dedicated guideways.

2. To permit average travel speeds of between 50 and 150 miles per hour.

3. To permit stations to be located at separations of as little as several hundred yards.

4. To permit all users of the system to travel non-stop between their point of departure and their destination.

5. To be capable of continuous high-speed operation in all but the most extreme weather conditions, without congestion, and with extremely low probability of accidents.

6. To permit use of vehicles with seating capacities of as little as 2 passengers or as many as 200 passengers, or with a variety of seating capacities, all at the option of the operator of the system.

7. To have maximum capacity of 25,000 vehicles per one-way guideway lane per hour, more or less, for vehicles with seating capacities of 2 to 10 passengers.

8. To have maximum capacity in excess of 500,000 passengers per one-way guideway lane per hour, when using vehicles with seating capacities of between 50 and 200 passengers.

9. To permit vehicles to exit the dedicated guideway and operate on local streets, in order to allow passengers to travel directly and conveniently to destinations as far as 10 to 20 miles from the nearest station, and return.

10. To provide on-demand service, with waiting times no greater than one to two minutes under most circumstances.

11. To provide comfortable, low-cost transportation that passengers will prefer to use over private automobiles and other forms of mass transit.

12. To permit all-electric operation, with zero emission of combustion products by vehicles on the dedicated guideway or on local streets.

13. To provide a means of enabling the widespread use of electric vehicles on city and suburban streets, unconstrained by the present limitations of batteries and other systems for storing electrical energy.

14. To provide a highly energy-efficient system for mass-transit.

15. To provide highly convenient and user-friendly means of obtaining transportation on the system.

16. To permit passengers on the system to conveniently carry personal baggage.

17. To permit the system to be used to transport light freight whenever full capacity is not needed to transport passengers.

18. To permit vehicles powered by gasoline (or any other means), which operate on ordinary highways, to be designed to have capability to enter the dedicated guideways and be transported electrically by them to an exit point.

19. To permit use of the dedicated guideways by vehicles which are either (i) owned by the system operator and rented by the passenger or freight transporter or (ii) owned by the passenger or freight transporter.

20. To permit dedicated guideways to be built along, above, or under existing streets or other rights of way.

21. To permit all vehicles on the dedicated guideways to be centrally controlled by a global control center, and all vehicles in stations to be centrally controlled by local control centers.

22. To provide remotely controlled operation of all vehicles on dedicated guideways or in stations, while permitting independent operation of vehicles by passengers on local streets outside of stations.

23. To permit programmed, precision control of electromagnetically linked vehicles, so vehicles can be safely operated at high speed on the dedicated guideways while maintaining vehicle separations on the order of one vehicle length or less.

These and further objectives are hereinafter discussed in greater detail, and are particularly delineated in the appended claims.

The foregoing objectives are achieved by the present invention, which is an electromagnetic transportation system with the following characteristics:

1. A dedicated guideway with an embedded linear synchronous motor or other linear motor, which uses coils embedded in the guideway to carry an electric current which provides the propulsion force for vehicles on the guideway.

2. A global command and control system, including sensors, computers, displays, and means of communication, which interacts with the linear motor to maintain and adjust vehicle speeds and separations.

3. Vehicles which are supported and guided by wheels and which can have seating capacities of as few as 2 passengers or as many as 200 passengers. In the alternative, total or partial support for wheeled vehicles on the dedicated guideway can be provided by compressed air, aerodynamic lift or repulsive magnetic levitation.

4. Vehicles with a system of on-board magnets (which may be permanent magnets, electro-magnets or superconducting magnets, as appropriate for the particular size and weight of the vehicle), to enable them to be propelled by the force generated by the electromagnetic field resulting from the current in the linear motor coils embedded in the guideway.

5. An on-board electrical storage system for each vehicle, to provide the vehicle with (i) on-board power while operating on the dedicated guideway, and (ii) propulsion while operating within stations and on local streets, where there are no embedded linear motor coils. Vehicle range and/or convenience of use for off-guideway operation may be increased by addition of an alternate means for off-guideway propulsion, such as a gasoline powered internal combustion engine.

6. A power pick-up system for each vehicle, to enable the on-board electrical storage system of the vehicle to recharge using guideway power from the current in the linear motor coils.

7. A system of entry and exit ramps to permit vehicles to enter and exit the dedicated guideway, with each ramp having (i) embedded linear motor coils to accelerate or decelerate vehicles, and (ii) a length sufficient for acceleration at a chosen rate from the speed at the beginning of the entry ramp to the maximum guideway cruising speed, or for deceleration at a chosen rate from the maximum guideway cruising speed to the speed at the end of the exit ramp.

8. An automated system for turning the wheels on vehicles to allow vehicles to be steered (i) from the dedicated guideway onto exit ramps; (ii) from entry ramps onto the dedicated guideway, or (iii) within stations, while transiting between parking spaces and entry or exit ramps.

9. An automated system for sequencing vehicles and for calculating desired vehicle speeds and positions in order for the command and control system to allow vehicles to merge with the traffic on the dedicated guideway when entering from an entry ramp, to leave the traffic on the dedicated guideway when exiting onto an exit ramp, and to merge with the traffic flow within each station, all in a pre-programmed manner which assures continuous, high-speed operation of vehicles on the guideway.

10. Stations which consist of (i) parking spaces where vehicles are loaded and unloaded, (ii) a paved surface area over which vehicles can travel, under on-board power, between parking spaces and entry or exit ramps, (iii) automated user interfaces at each parking space and/or at other designated locations, where passengers can (a) communicate with the system to specify their destinations and obtain relevant information, such as current waiting time, travel time and fare for any specified destination, (b) request pick-up by the next available vehicle, and (c) pay their fares.

11. Local command and control systems which operate vehicles within stations.

12. A means of communication between the global command and control system and the local command and control systems within each station, in order to assign vehicles to guideway slots in such a manner that a pre-programmed, smooth, continuous and high-speed traffic flow is maintained for all vehicles from the instant they depart their parking space at one station until the instant they arrive at their parking space at another station.

13. An automated gate system (i) to allow vehicles to exit or enter stations to or from local streets; (ii) to transfer vehicle control from the local command and control system in a station to the driver of the vehicle upon exiting the stations, and vice versa upon entering the stations; (iii) to allow passengers in vehicles exiting or entering stations to or from local streets to obtain relevant information such as waiting times, travel times and fares; (iv) to determine and obtain payment of any required fare before allowing a vehicle to enter a station from local streets; and (v) to limit or delay vehicle access to stations, if necessary to maintain a continuous and smooth traffic flow within the stations and/or on the guideway.

14. Emergency systems to decelerate vehicles and protect passengers upon the appearance of dangerous circumstances, such as extreme weather conditions, guideway disruptions or obstructions, power failures, or incapacity of a vehicle.

15. Means for preventing accumulation of debris or precipitation on guideway or ramp surfaces, or within stations.

BRIEF DESCRIPTION OF THE DRAWINGS

The invention is hereinafter described upon reference to the accompanying drawings, in which:

FIGS. 5A, 5B and 5C illustrate the manner in which entry and exit ramps connect the guideway to stations, wherein FIG. 5A shows a typical exit ramp branching point, FIG. 5B shows a typical entry ramp branching point, and FIG. 5C shows a typical system of branched entry and exit ramps connecting a station to a guideway;

DETAILED DESCRIPTION OF THE INVENTION

Figure 1:
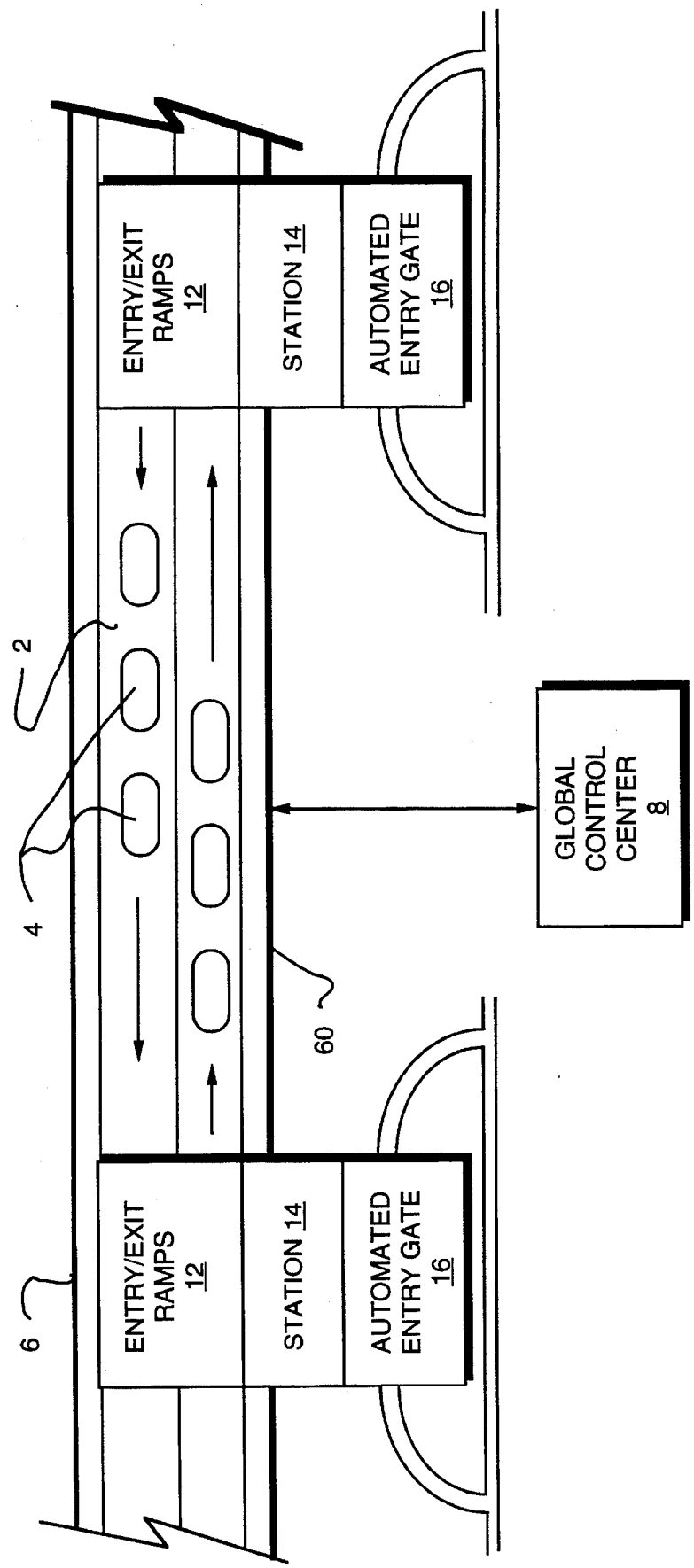
FIG. 1 is a system block diagram which illustrates a typical implementation of the transportation system.

FIG. 1 illustrates a typical implementation of the transportation system. This implementation consists of a dual guideway 2 with a roadway lane for travel in each direction. Both lanes have embedded linear motor coils for propulsion of the vehicles 4 along the guideway surface. The guideway power distribution system 6, which includes the linear motor coils and their power modules, is shown schematically. Vehicles on the guideway are globally controlled by the global control center 8 which communicates with the vehicles and the other elements of the system through the communications network 60. Vehicles enter and exit the guideway by manner of entry and exit ramps 12 which run to stations 14. Vehicles may be loaded or unloaded in stations or they may pass through the stations to or from city streets by means of an automated vehicle gate FIGS. 2A and 2B illustrate an electromagnetic roadway with FIG. 2A showing the roadway in cross-section and FIG. 2B showing a top view of a section of roadway with a transparent surface for the purpose of clarity of illustration only.

Figure 2A:
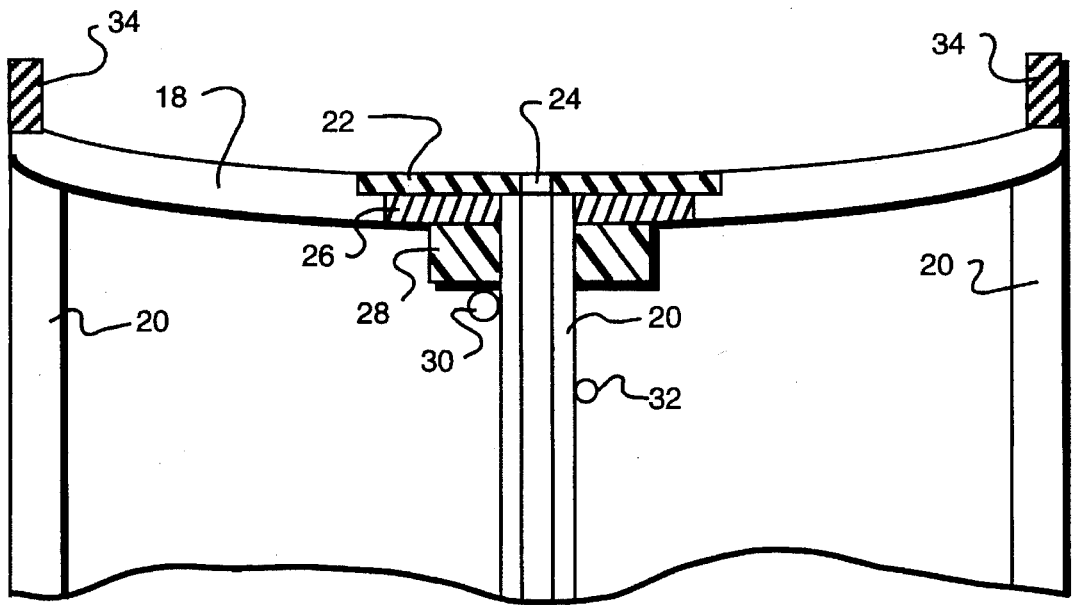
FIG. 2A shows a vertical cross section of a typical guideway.
Figure 2B:
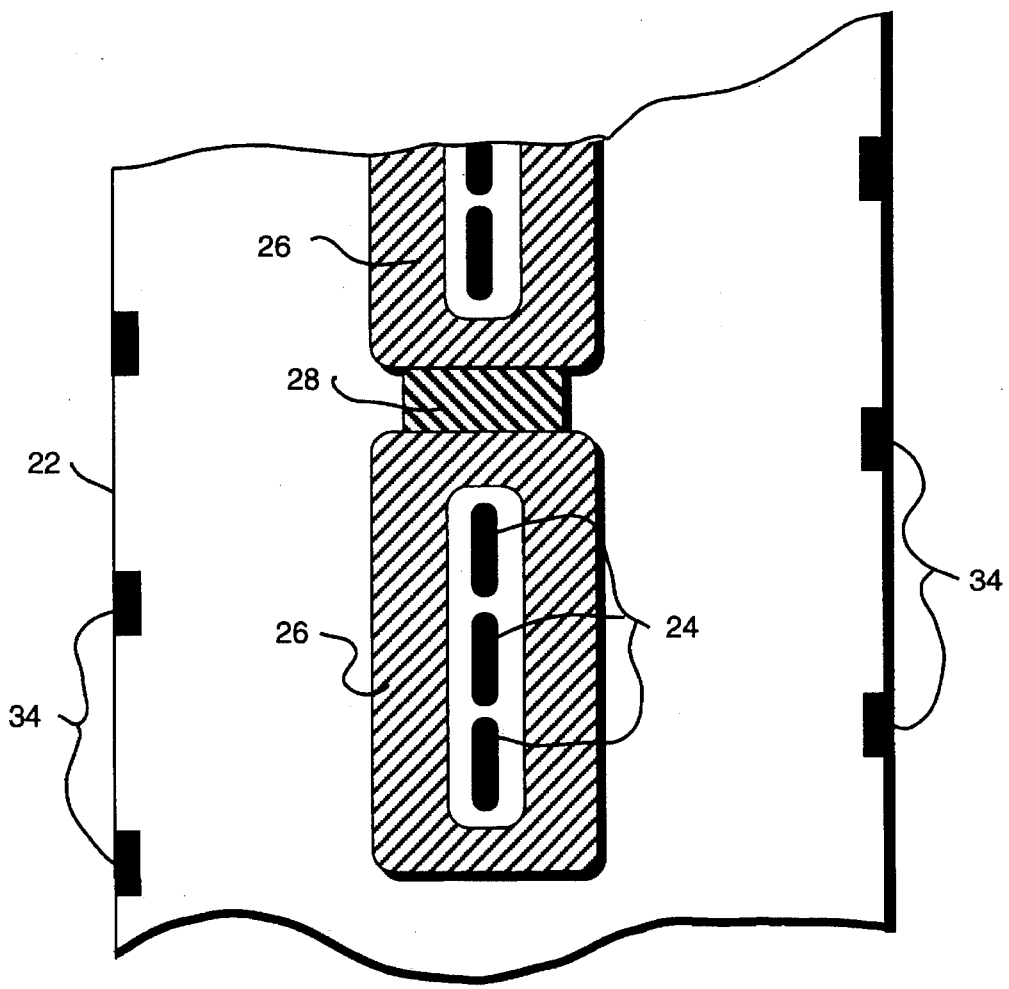
FIG. 2B shows a top view of a typical guideway with the surface cut away.

Referring to FIG. 2A, the roadway 18 is held up by supports 20 which allow maintenance access underneath the roadway. The top of the roadway 18 has an embedded wear surface 22 where the vehicle wheels will contact the roadway. The roadway 18 is concave to aid in stabilizing the vehicle in the center of the roadway. Alternately, the roadway 18 may be implemented by placing the wear surfaces 22 in depressed concave troughs, to which the vehicle wheels will be confined. Drainage slots 24 will provide for removal of unwanted material from the roadway. The linear motor coils 26 are contained under the roadway surface with access from underneath. Power modules 28 provide the drive current for the coils with the proper wave form for the desired vehicle motion. They derive power from the nearby power line 30. The power modules are controlled by computer via the communication network cable 32. Vehicle data transceivers 34 allow the vehicle 38, FIG. 4, to communicate with the system network, FIG. 3.

Vehicle speeds and separations on the guideway are centrally controlled by varying the frequency and phase of the electric current in the linear motor coils 26. Vehicles are not independently operated while on the guideway; as a result, all vehicles affected by an abnormal system condition can be simultaneously decelerated. This permits operation at much closer spacings than would be safe for vehicles which rely on individual operators to detect and react to abnormal conditions.

In general, the permissible minimum vehicle separation, S, is given by $$S = Vt_r \qquad (1)$$

where v is the vehicle velocity and $t_r$ is the reaction time for the system to detect an abnormal condition that affects only one vehicle and commence deceleration of the following vehicles. Since, for each vehicle, speed, acceleration and subsystem operation are continuously monitored, reaction times much less than one second are achievable. The density of vehicles per mile, p, is given by $$p = \frac{5280}{S+L} \qquad (2)$$

where L is the average vehicle length, and S and L are measured in feet. System capacity, k, is then given by $$k = npv \qquad (3)$$

where n is the average number of passengers per vehicle.

From these considerations it is clear that the capability of the system to achieve high speeds and low reaction times enables a single lane of guideway to achieve a capacity many times greater than that of a single highway lane. For example, if $t_r$ is 0.1 second, v is 225 feet/second, L is 20 feet and n is 6, then system capacity is approximately 168,000 passengers per hour (corresponding to approximately 28,000 vehicles per hour). This is more than 15 times the capacity of a single highway lane. Even higher capacities are achievable if van or bus-type vehicles are used. For example, if, in the foregoing example, L is changed to 75 feet and n is increased to 45, capacity rises to approximately 530,000 passengers per hour.

Figure 3:
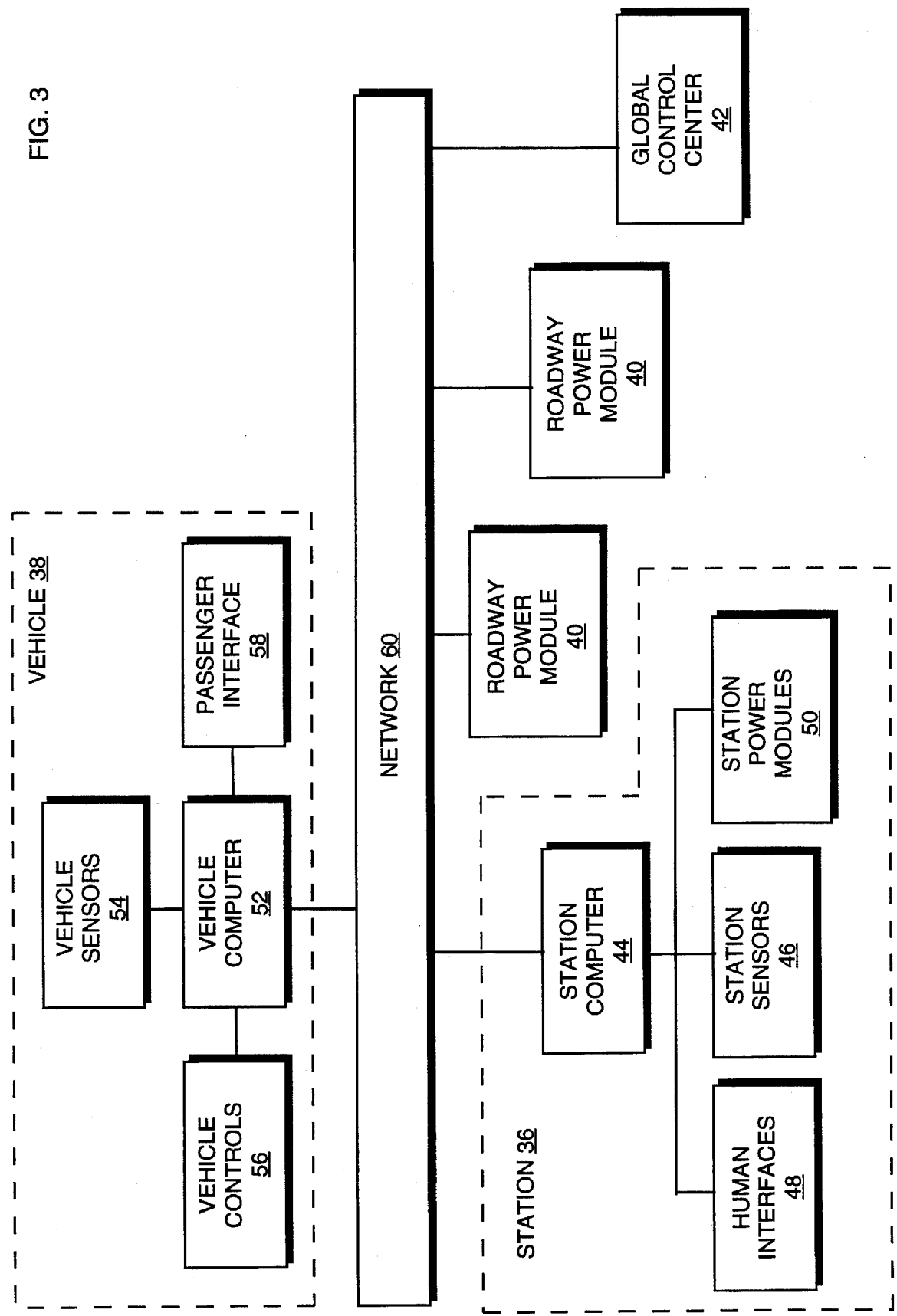
FIG. 3 is a block diagram of the Command and Control System.

FIG. 3 illustrates schematically the Command and Control System for a complete transportation system. Only one station 36, one vehicle 38 and two power modules 40 are shown for clarity of the illustration. For an actual system, these components would be replicated many times, as required to meet ridership demand. All stations 36, vehicles 38, and power modules 40 are monitored and controlled by a global control center 42. This control center conducts all scheduling, vehicle tracking, system condition monitoring, wave form generation, and other vehicle and system control functions. Within each station 36 there is a station computer 44 which controls local station functions. It gathers local data through station sensors 46, which monitor conditions within the station, as well as from the human interfaces 48 and from vehicles 38 within the station. The station computer controls the power modules 50 within the station and thereby moves the vehicles 38 that are in the station. The computer interfaces with passengers in the kiosk area through the human interfaces 48 which could be, but are not limited to, touch sensitive display screens, voice recognition devices, etc. Human interfaces 48 are also provided for local computer operators and maintenance personnel. Each vehicle 38 has an on-board vehicle computer 52. This computer receives vehicle information from the vehicle sensors 54. The vehicle computer also drives the vehicle controls 56 which include steering, braking and drive motor operations. Passengers can communicate with the computer via the passenger interface 58. This interface allows the passenger to request and receive transportation information as well as initiate new travel requests.

The power modules 40 receive control information from the global control center 42 and transmit their status back to the control center.

All communication is via the network 60. This network extends the entire length of the guideway, linking all vehicles, stations and other system components. The network 60 allows the global control center 42 to access information and assert control over all stations, vehicles and power modules in the system. It also allows station command and control systems to safely unload the roadway in the event of a complete global control center failure.

Figure 4:
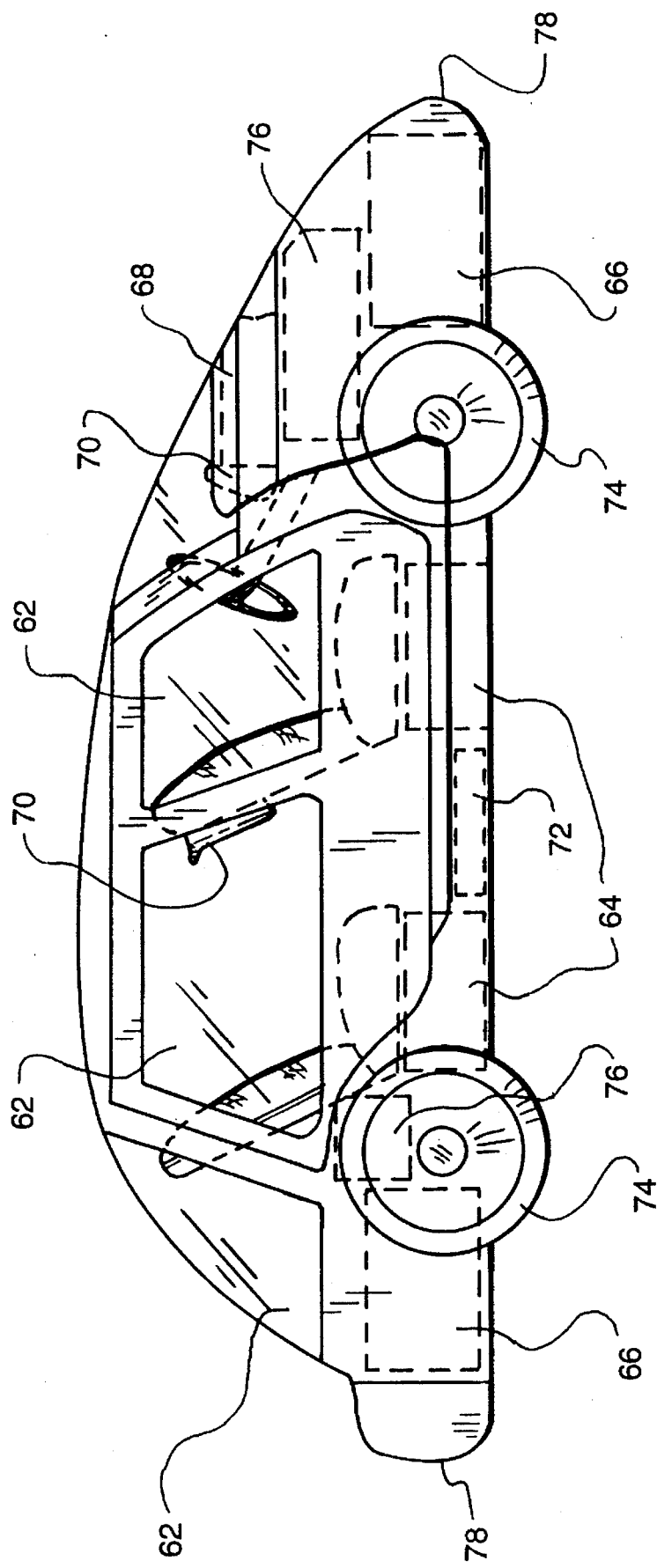
FIG. 4 shows a cross section of a typical implementation of an automobile-sized vehicle.

The vehicle 38, as shown in FIG. 4, has the following principal components: a passenger and/or cargo section 62, power module(s) 64, magnet modules 66, command and control module 68, interactive displays 70, power pick-up module(s) 72, wheels 74, drive and steering motors 76, and bumpers 78. Several types of vehicles are contemplated. In particular, vehicle types will include large bus-type or van-type multi-passenger vehicles with multiple rows of seats and baggage space, small automobile-type vehicles for providing personalized transportation services for one to several passengers and their baggage, and cargo vehicles, adapted to carrying containerized modules of light freight. The vehicle shown in FIG. 4 is an example of a small automobile-type vehicle.

Each vehicle, as it moves down the guideway is propelled by the interaction between the current in the linear motors coils embedded in the guideway and the vehicle magnets 66. These may be permanent magnets, electromagnets, or superconducting magnets, depending on the vehicle size and the operating specifications of the particular system. Magnets may be placed in the extreme front and rear of the vehicle for fore-aft lateral stability, and to minimize field strengths in the passenger compartment. Magnets may also be located so as to maximize magnetic coupling for propulsion. Vehicle support and supplemental guidance on the guideway are provided by the wheels 74, which also are capable of being coupled to the drive motor 76 to provide off-guideway propulsion; however, during guideway operation the wheels may be decoupled from the drive motor.

In principle, the propulsion system may be based on any linear motor technology, including the linear synchronous motor and the linear induction motor (synchronous or non-synchronous). However, since a primary purpose of the invention is to achieve both high speed and high system capacity, it is critical to be able to have precision control of all vehicles by means of a central global control system. Under ridership conditions typical of most urban areas, this will generally require that the linear motor be synchronous.

For operation at speeds above approximately 80 miles per hour, tire wear may become a significant component of system operating costs. For systems designed to operate at such high speeds, to reduce the cost of tire replacement, vehicle support may alternatively be provided by aerodynamic lift, compressed air, or repulsive magnetic levitation, or by any combination of the foregoing means of providing vehicle support.

The vehicle power modules 64 provide on-board power during guideway and off-guideway operation, as well as propulsive power during off-guideway operation. They are also capable of supplying power to the guideway for the purpose of providing an emergency deceleration capability in the event of a loss of guideway power. Typically the power modules 64 will consist of batteries of the type used or being developed for use in electric automobiles. However, the power modules 64 could include an alternate source of power for off-guideway propulsion, such as an internal combustion engine or a fuel cell, to improve off-guideway range and ease of refueling.

The vehicle power pick-up module 72 enables the vehicle to obtain power from the guideway to recharge batteries or for other needs. This module 72 may consist of appropriately designed coils, as shown in FIG. 4; however, the more typical implementation will likely be to use the kinetic energy of the moving wheels to power a generator or alternator. The power pick-up module 72 will be decoupled from the vehicle power system during off-guideway operation.

The vehicle command and control module 68 contains an on-board computer, sensors, and communications and sensor interfaces. Sensors will monitor vehicle position, speed and acceleration, as well as the condition of the various vehicle systems and components. Alternatively, instantaneous vehicle speeds and accelerations may be calculated by the computer based on repeated measurements of vehicle position as a function of time, using any sufficient means of measuring position, such as the Global Positioning System. Sensor output will be communicated via the network to the global command and control system continuously to allow it to maintain appropriate vehicle velocity and acceleration to meet ride quality standards, and to detect incipient system failures or other abnormalities in time to take preventive action. Sensor output and information from the global command and control system will also be communicated via the network to passengers through the interactive displays 70. The interactive displays 70 will also enable passengers to communicate with the system via the network for various purposes, for example, to alter their destination en route.

The vehicle drive and steering motors 76 can be coupled to the other systems in such a manner as to allow a passenger to operate the vehicle as an ordinary automobile for off-guideway use. On the guideway the drive motors may be decoupled from the system; however, the steering motors will then be coupled to the system in such a manner as to accept inputs from the global command and control system and/or the on-board computer, to provide vehicle guidance, including, especially, turning from the guideway onto exit ramps and from entrance ramps onto the guideway. During guideway operation the steering motors will not be capable of being controlled by passengers, except possibly under certain emergency conditions.

The bumpers 78 are special shock-absorbing bumpers which may contain magnets to enable vehicles to safely collide with and couple to the immediately preceding and/or the following vehicle during high-speed operation. This capability will allow the system to use the small inter-vehicle separation as a safety feature, to control vehicles which experience sudden failure of a principal component (such as loss of on-board power, computer failure, propulsion magnet failure or flat tire), by coupling the crippled vehicle to the following and/or preceding vehicle before it experiences a significant uncontrolled acceleration or deceleration, and removing the coupled vehicles from the guideway.

The passenger/cargo compartment 62 can be designed for passenger comfort or utility, to the specifications of the system operator.

Figure 5A:
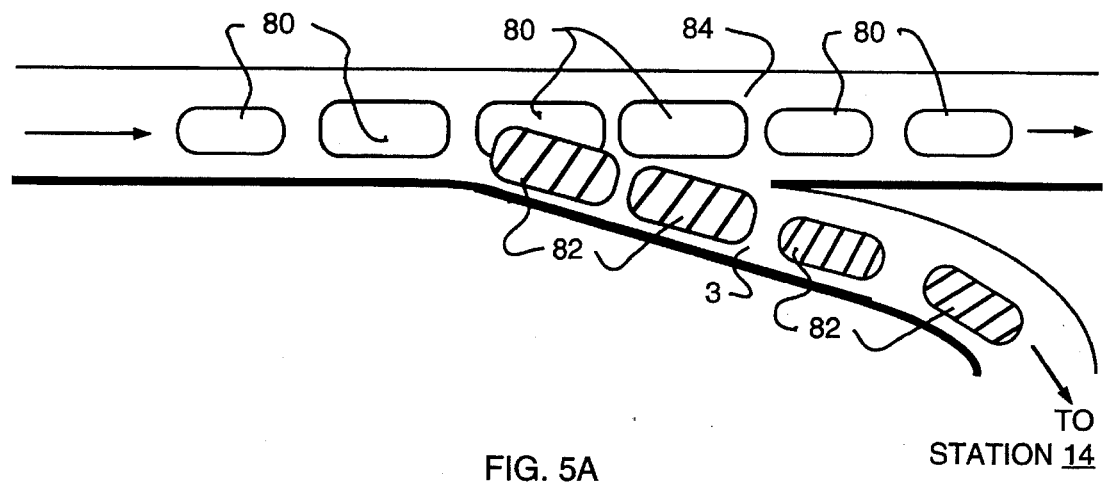
Figure 5B:
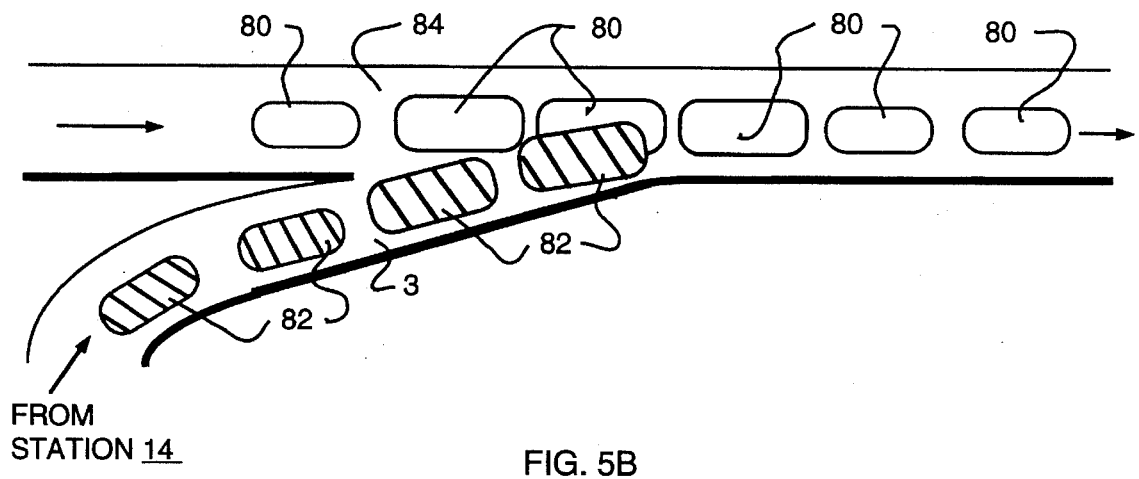

FIGS. 5A and 5B illustrate a possible implementation of a set of entry and exit ramps. These ramps have embedded linear motor coils to accelerate or decelerate vehicles, and are joined to the guideway at branching points. In the implementation shown in FIGS. 5A and 5B, FIG. 5A illustrates an exit ramp branching point, and FIG. 5B illustrates an entry ramp branching point. Referring to FIGS. 5A and 5B, the guideway linear motor coils 80 broaden as the guideway enters the branching point, and narrow again after it passes the branching point. Similarly, the ramp linear motor coils 82 are broader in the branching point and narrow as one moves along the ramp away from the guideway. This broadening of the linear motor coils at the branching point facilitates vehicle control during switching, which is accomplished by using the vehicle steering motor to turn the vehicle wheels. Precise geometrical data on each branching point are stored in the memory of the global control system and transmitted to the vehicle's on board computer, so that it can calculate the exact amount and timing of the wheel motion necessary to accomplish the turn for the vehicle's speed. At each branching point the guideway's embedded wear surface 84 divides; turns are executed in such manner that the vehicle wheels follow the embedded wear surface.

Figure 5C:
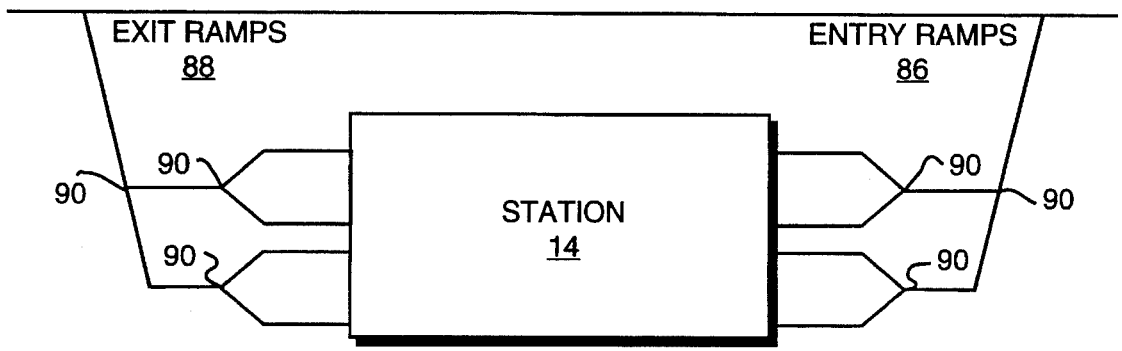

Ramps may connect one guideway with another guideway, or they may connect a guideway with a station. FIG. 5C illustrates a typical system of entry ramps 86 and exit ramps 88 which connect a guideway with a station. The entry and exit ramps are shown with several branching points 90, at which they divide into additional ramps. This branching is necessary to assure an uncongested traffic flow between guideway and station. More particularly, it is possible that several consecutive vehicles will have the same station destination. Because these may be running at very close spacing on the guideway, there may be insufficient distance on the exit ramp to allow them to decelerate simultaneously on the exit ramp without causing traffic on the guideway to slow down. To allow an exit (or entry) ramp to accommodate the same vehicle flow rate as the guideway, the ramp system must have the capability to route vehicles to alternate branches for slower speed operation. If each exit ramp has n branches, then the entire traffic flow of the guideway can be switched to the ramp and maintained at the same rate, while decelerating each vehicle to a speed of v/n, where v is the guideway speed, even if there is zero separation between vehicles on the guideway. Similarly, entry ramps must have sufficient branches to allow vehicles to be simultaneously accelerated and sequenced onto the guideway, without causing congestion within the station. This system of branching ramps has the further advantage that it allows stations to be designed with distributed parking spaces (either on different levels or in different areas on the same level), so that different ramp branches can feed different areas, which can be used on an as-needed basis during high traffic periods when parking spaces in primary areas may be full. The station command and control system will use appropriate routing algorithms to assign each vehicle to an exit or entry ramp branch.

Ramp length must be sufficient to permit acceleration or deceleration from the speed at the beginning of the ramp to the speed at the end of the ramp. Thus each branch must have length, D, given by $$D = \frac{\Delta v^2}{2a} \quad (4)$$

Where a is the chosen acceleration and $\Delta v$ is the difference in velocity between the beginning and end of the branch. If, for example, one assumes a guideway velocity of 225 feet per second, a station velocity of 25 feet per second, and an acceleration of 0.4 g, then the minimum ramp length would be approximately 1500 feet. This is a design advantage for the system, in that it permits (but does not require) stations to be conveniently sited at some distance from the guideway. Furthermore, it permits exit and entry ramps to be separated by less than the minimum ramp length, because an appropriate choice of ramp geometry can avoid overlap. Thus the system can accommodate closely spaced stations in urban areas. Moreover, since, from these stations, vehicles can access the adjacent city streets, the system is capable of taxi-type point to point service between any pair of points anywhere in the metropolitan area served.

Figure 6:
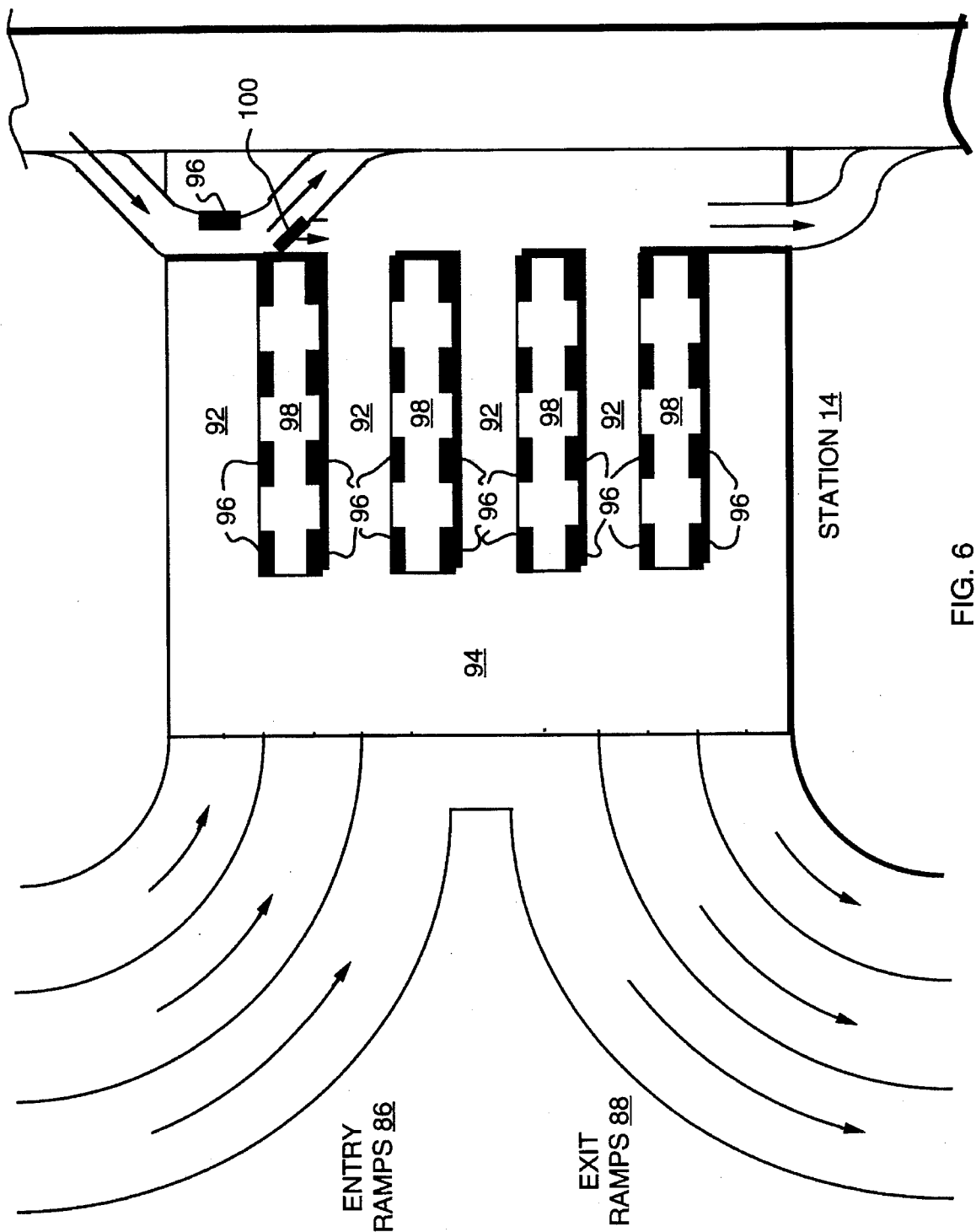
FIG. 6 is an illustration of a typical station.

FIG. 6 illustrates a typical station, which consists of parking spaces for vehicle loading and unloading 92, a paved surface area over which vehicles can travel between parking spaces and entry or exit ramps under on-board power 94, automated user interfaces 96 at each parking space and/or at other designated locations, walkways to provide passengers with access to vehicles 98, and automated gates 100, through which vehicles can be driven form the station to city streets and vice versa.

Figure 7:
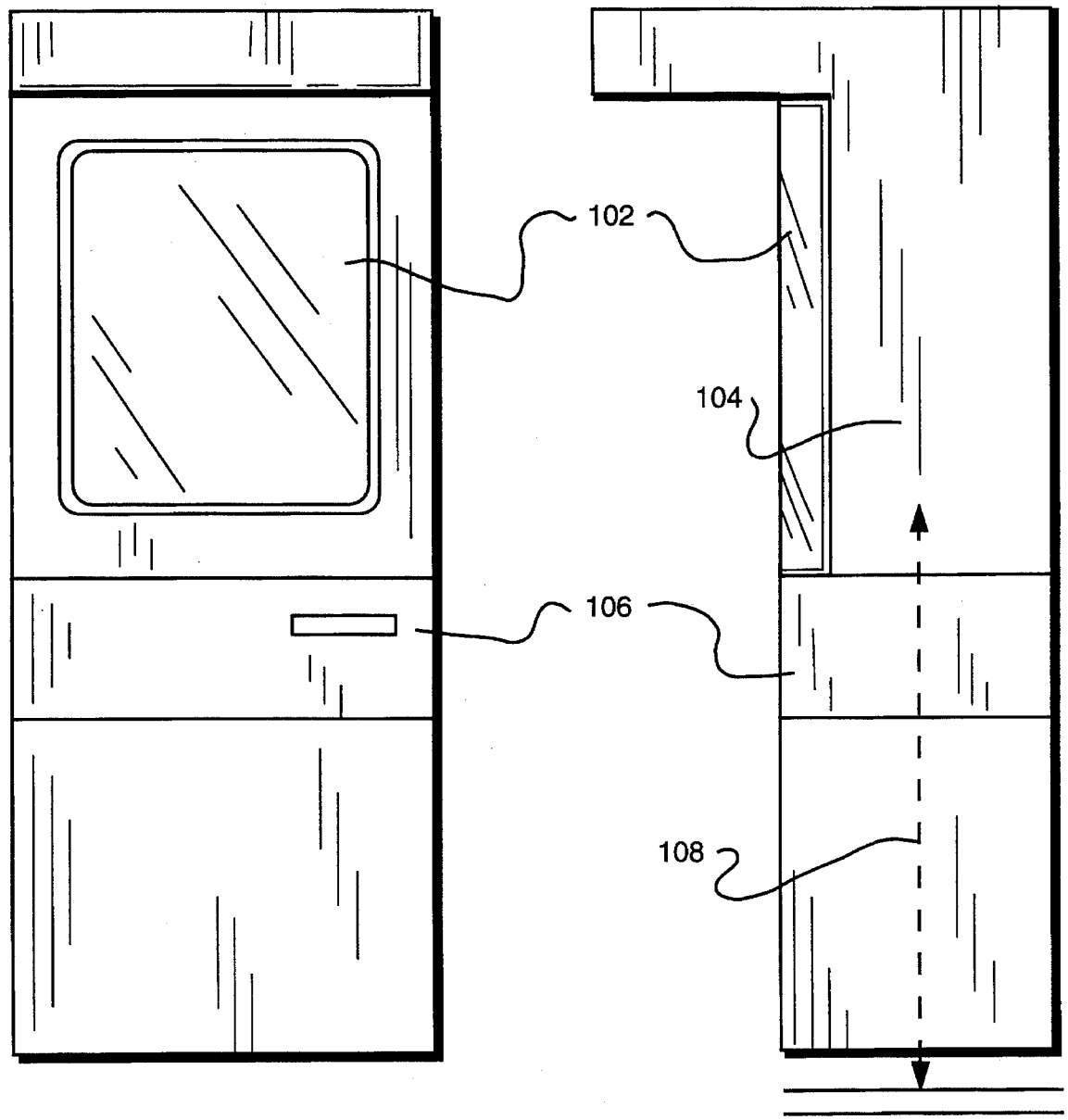
FIG. 7 illustrates a typical means whereby passengers gain access to the system, wherein the Figures illustrate a typical automated user interface for passengers who enter a station on foot.

FIG. 7 illustrates front and side views of a typical automated user interface, which consists of an interactive display 102, a computer 104, a fare collection module 106, and a communications network 108. The interactive display 102 may consist of touch-sensitive display screens, keyboards, voice recognition systems and/or other devices. These allow passengers to communicate their destination to the global command and control system, by means of the computer 104 and communications network 108, which will then receive from the system the necessary information to inform the passengers of the travel time, waiting time and fare to all stations within a selected distance of that destination. Passengers can then select a station destination, and can also select the mode of travel thereto. For example, for different fare options, passengers could choose to travel by multi-passenger van, by personal vehicle, or by personal vehicle authorized to exit the destination station to travel to an off-guideway location. The interactive capabilities of the system also permit it to ration capacity at congested stations during peak periods by instantaneously adjusting fares.

The fare collection module 106 allows passengers to pay for transportation by means of credit cards, debit cards, prepurchased fare cards, cash, or any other commonly used payment mechanism. Passengers who travel by personal vehicle will receive a boarding pass which will be necessary to activate the vehicle. Passengers who travel by multi-passenger van will be routed to the appropriate vehicle boarding area.

Figure 8:
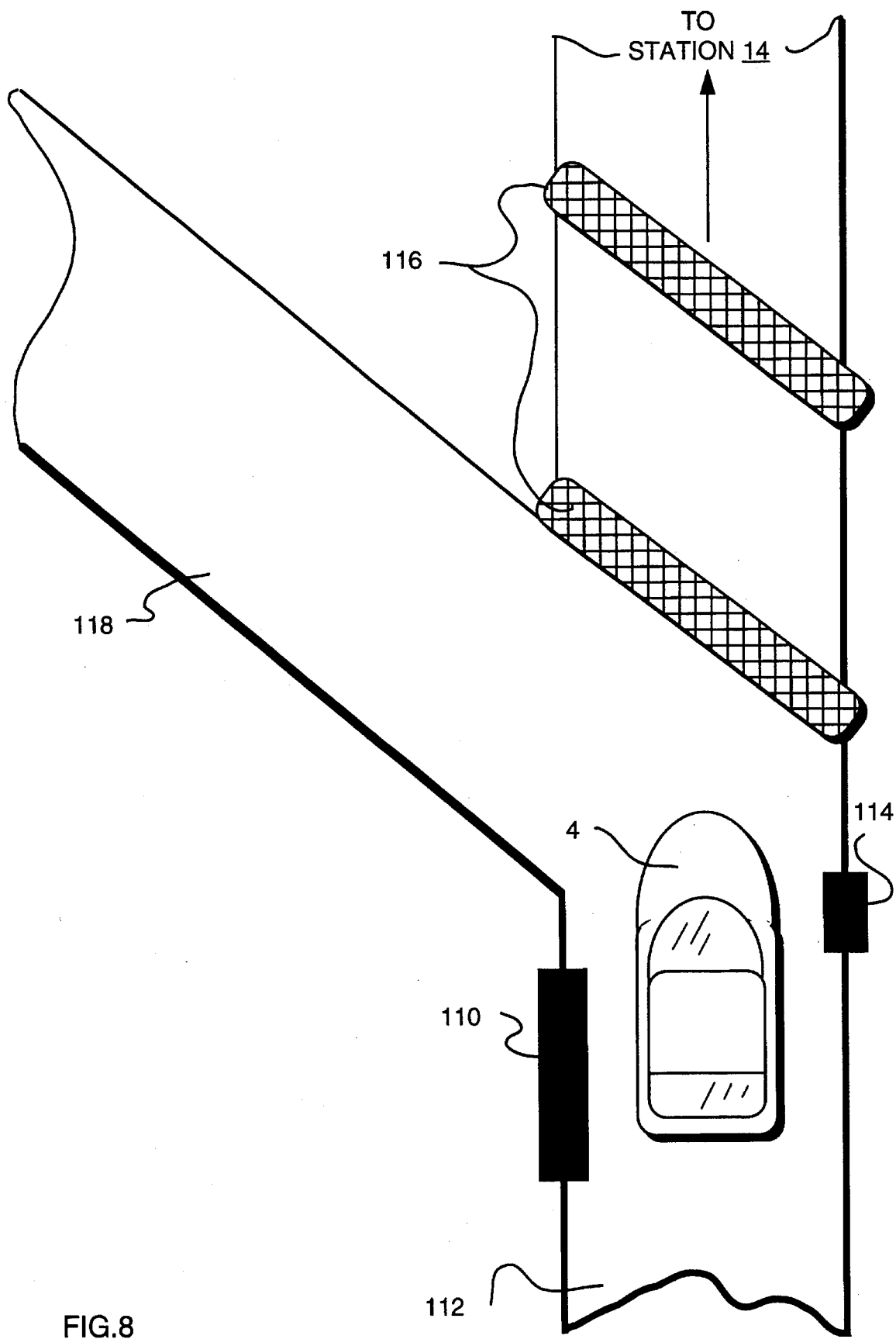
FIG. 8 illustrates a typical automated gate for passengers who arrive at a station in a vehicle.

FIG. 8 illustrates a typical automated gate. It includes an automated user interface 110 (FIG. 7A) with interactive display, computer, fare collection module, and communications network. In addition, the gate includes a vehicle passageway 112, through which vehicles pass between the station and the adjacent city streets, a vehicle examination module 114, a station access gate 116 and a shunt roadway 118. The vehicle examination module 114 contains devices which make inquiry of sensors and communication devices on board a vehicle attempting to enter the station, to verify that the vehicle is one capable of operating on the guideway, that all vehicle systems are functioning sufficiently well that the probability of failure during guideway operation is below the maximum permissible level, and that all charges for the off-guideway use of the vehicle have been paid. The vehicle examination module also makes inquiry of vehicles attempting to exit the station to verify that they are authorized for off-guideway use and that all criteria for off-guideway operation are satisfied. Once a vehicle is authorized for guideway operation, it is permitted to pass through the station access gate 116. If the vehicle is denied authorization for guideway operation, it must drive onto the shunt roadway 118 which exits onto local streets.

Further modifications and improvements will occur to persons skilled in the art and all are considered to be within the spirit and scope of the invention.

What is claimed is:

1. A transportation system comprising:
   a. a dedicated guideway with embedded means for carrying a modulated electric current which generates a varying electromagnetic field for propelling vehicles on said guideway;
   b. a plurality of vehicles, each vehicle having a means of being supported on the guideway, each vehicle also having a means of being propelled by generating a d-c magnetic field, to create a propulsive force by interacting with the electromagnetic field of the modulated electric current in the guideway, and each vehicle also having a means of being guided on the guideway, and each of said plurality of vehicles also having a means of being supported off the guideway, a means of being propelled off the guideway, and a means of being guided off the guideway, to enable each vehicle to operate off the guideway on roads and streets, and each of said plurality of vehicles also having a means of switching from the means of being supported on the guideway, the means of being propelled on the guideway, and the means of being guided on the guideway, to the means of being supported off the guideway, the means of being propelled off the guideway and the means of being guided off the guideway, and vice versa;
   c. a system of entry and exit ramps joined to the guideway in such manner as to assist and enable each vehicle to switch between such ramps and the guideway, each ramp having embedded means for carrying a modulated electric current to generate a varying electromagnetic field for propelling, accelerating and decelerating vehicles on said ramp, and, further each ramp having a length sufficient for vehicle acceleration and deceleration at a chosen rate from the vehicle speed at the beginning of the ramp;
   d. a global control center for centrally controlling vehicles operating on the guideway and on entry and exit ramps;
   e. means for communicating data, information and commands between and among vehicles, the global control center, at least one local control center, and the means for modulating the electric current in the guideway;
   f. means for programming the operation of vehicles on the guideway and on entry and exit ramps to assure uninterrupted traffic flow on the guideway at a chosen operating speed, including means for determining the instantaneous guidance and propulsion forces needed to be applied to each vehicle, means for sequencing and scheduling vehicles travelling on the guideway, and means for determining adjustments to relative positions of vehicles on the guideway as necessary to permit entering and exiting vehicles to merge with and disengage from guideway traffic; and
   g. means for monitoring and adjusting the programmed operation of vehicles, including means for determining the instantaneous position, velocity and acceleration of each of said plurality of vehicles on said guideway and on entry and exit ramps, and means for comparing the determined instantaneous position, velocity and acceleration of each vehicle with an expected instantaneous position, velocity and acceleration.

2. The transportation system of claim 1 further including vehicle systems, said vehicle systems including at least one vehicle system selected from the group consisting of: means for storage of energy for on-board use, means to enable energy to be obtained from electric current in the guideway and transferred to the vehicle's means for storage of energy and vice versa, means for displaying data and information for passengers, means of securing passengers in their seats, means of securing cargo, means for storing and processing information needed for the vehicle's operation, and means for passengers to use the transportation system's means of communicating between vehicles and the global control center.

3. The transportation system of claim 2 further including vehicle diagnostics for sensing the status of vehicle systems and the status of the means for on-guideway and off-guideway support, propulsion and guidance, in order to determine the need for maintenance thereof and to detect incipient failures.

4. The transportation system of claim 3 further including stations disposed adjacent to entry and exit ramps and having parking spaces where vehicles are loaded and unloaded, a paved surface area over which vehicles can travel between parking spaces and entry and exit ramps, and automated user interfaces for providing passengers with relevant information including current waiting time, travel time and fare for any destination specified by the passengers, and for enabling passengers to communicate with the global control center to specify their destinations, obtain authorization for boarding, and pay their fares.

5. The transportation system of claim 4 further including local control centers at each station for centrally controlling vehicle operations within the station, each such local control center having means of communicating with vehicles and the global control center, means of programming vehicle motions, and means of monitoring and adjusting vehicle motions.

6. The transportation system of claim 5 further including automated gates, disposed adjacent to said stations and entry and exit ramps, for allowing vehicles to transit between exit and entry ramps and local streets, with each such automated gate having means to engage and disengage means of propulsion, support and guidance on board any vehicle such that, upon passing through the automated gate, vehicle control is transferred between a vehicle passenger and one control center selected from the group consisting of the global control center and the local control centers at each station.

7. The transportation system of claim 6 further including an automated user interface and means to authorize and deny vehicle transit through any automated gate, including means for obtaining information from said vehicle diagnostics, means, responsive to the means for obtaining information from said vehicle diagnostics, for preventing entry of any vehicle with an incipient system failure, and means, responsive to information on current system traffic, to adjust the rate of traffic flow through any automated gate.

8. The transportation system of claim 2 in which the means for the storage of energy for on-board use also comprises the means of providing propulsive power for the off-guideway operation of the vehicles.

9. The transportation system of claim 1 further including branched entry and exit ramps, each entry and exit ramp being branched into various additional ramps of the same character, as necessary to permit each entry and exit ramp and its branches to achieve the same vehicle flow rate as the maximum permissible vehicle flow rate on the guideway, independent of the speed of each vehicle on the ramp.

10. The transportation system of claim 1 further including means for decelerating vehicles on the guideway in emergencies and to protect passengers upon the appearance of dangerous circumstances.

11. The transportation system of claim 1 in which said off-guideway means of supporting each vehicle consists of at least three wheels, with at least one such wheel supporting the front half of the vehicle body and at least two such wheels supporting the rear half of the vehicle body, and wherein the on-guideway means of supporting each vehicle includes at least one support means selected from the group consisting of: wheels, repulsive magnetic levitation, compressed air, and aerodynamic lift.

12. The transportation system of claim 11 in which said means of supporting each of said plurality of vehicles on the guideway includes the same wheels which comprise the means of supporting that vehicle off the guideway, and said means of guiding each of said plurality of vehicles on the guideway includes a means for turning at least one of the wheels which support the vehicle on the guideway, responsive to a means for instantaneously determining an amount of wheel motion necessary to negotiate the guideway and the entry and exit ramps, at each point thereon.

13. The transportation system of claim 12 in which said guideway has an embedded wear surface covering strips of limited width along the length of the guideway, upon which wear surface the on-guideway vehicle support wheels are constrained to travel.

14. The transportation system of claim 11 further including means for converting kinetic energy of rotation of vehicle support wheels to electrical energy, and for transmitting such electrical energy to a means for storing energy on-board the vehicle.

15. The transportation system of claim 1 in which each of the plurality of vehicles has at least two means for generating a d-c magnetic field for propulsion, with at least one such means located in the front half of the vehicle body and at least one such means located in the rear half of the vehicle body.

16. The transportation system of claim 1 in which said vehicles have means to enable vehicles to safely collide with and link with each other while operating at high speed on the guideway.

17. The transportation system of claim 1, in which said means of being propelled on the off-guideway operation of said vehicles includes a means which derives energy from a fuel supply on-board each of said vehicles.

18. The transportation system of claim 1, wherein the vehicles comprising:
   a. a body with internal compartments for carrying passengers, cargo, and means which enable the vehicle to be used in said transportation system;
   b. means of being supported on the guideway, such supporting means being provided at each vehicle;
   c. means for generating a d-c magnetic field to create a propulsive force by interacting with the electromagnetic field of the electric current in the guideway;
   d. means of being guided on the guideway;
   e. means of support, propulsion and guidance to enable the vehicle to be operated off the guideway by a passenger, in the manner of an ordinary motor vehicle;
   f. means of engaging and disengaging the foregoing means for on-guideway and off-guideway support, guidance and propulsion, to enable the vehicle to be controlled by the global and local control centers of the transportation system while on the guideway and in stations and by a passenger while off the guideway;
   g. means of communication between the vehicle and the global and local control centers of the transportation system; and
   h. means for obtaining information relevant to the use of the vehicle in the transportation system, including means for determining the instantaneous position, velocity and acceleration of the vehicle.

19. The transportation system of claim 18 further including vehicle systems, said vehicle systems including at least one vehicle system selected from the group consisting of: means for storage of energy for on-board use, means to enable energy to be obtained from electric current in the guideway and transferred to the vehicle's means for storage of energy and vice versa, means for displaying data and information for passengers, means of securing passengers in their seats, means of securing cargo, means for storing and processing information needed for the vehicle's operation, and means for passengers to use the transportation system's means of communicating between vehicles and the global control center.

20. The transportation system of claim 19 further including vehicle diagnostics for sensing the status of vehicle systems and the status of the means for on-guideway and off-guideway support, propulsion and guidance, in order to determine the need for maintenance thereof and to detect incipient failures.

21. The transportation system claim 19 in which said means for the storage of energy for on-board use is also the means for providing propulsive power for the off-guideway operation of vehicles.

22. The transportation system claim 18 further including a means for safely colliding one vehicle with and coupling to other vehicles during high-speed travel on the guideway.

23. The transportation system claim 18 further including a means for passengers to communicate and otherwise interact with the means on-board the vehicle for storing and processing information and with the global and local control centers of the transportation system, and means, responsive thereto, to provide information to passengers and to provide transportation services for passengers.

24. The transportation system claim 18, in which said off-guideway means of supporting each vehicle consists of at least three wheels, with at least one such wheel supporting the front half of the vehicle body and at least two such wheels supporting the rear half of the vehicle body, and wherein the on-guideway means of supporting each vehicle includes at least one support means selected from the group consisting of: wheels, repulsive magnetic levitation, compressed air, and aerodynamic lift.

25. The transportation system claim 24 further including means for converting kinetic energy of rotation of vehicle support wheels to electrical energy, and for transmitting such electrical energy to a means for storing energy on-board the vehicle.

26. The transportation system claim 18 in which said vehicles have at least two means for generating a d-c magnetic field for propulsion, with at least one such means located in the front half of the vehicle body and at least one such means located in the rear half of the vehicle body.

27. The transportation system claim 18, in which said means of supporting said vehicles on the guideway includes the same wheels which comprise the means of supporting the vehicles off the guideway, and said means of guiding the vehicles on the guideway includes a means for turning at least one of the wheels which support the vehicles on the guideway, responsive to a means for instantaneously determining an amount of wheel motion necessary to negotiate the guideway and the entry and exit ramps, at each point thereon.

28. The transportation system claim 18, in which said means of being propelled on the off-guideway operation of said vehicles includes a means which derives energy from an on-board fuel supply.

* * * * *